United States Patent [19]
Murphy

[11] Patent Number: 4,589,333
[45] Date of Patent: May 20, 1986

[54] BARBEQUE GRILL
[76] Inventor: Willard J. Murphy, Hwy. 25, Box 642, Monticello, Minn. 55362
[21] Appl. No.: 727,442
[22] Filed: Apr. 26, 1985
[51] Int. Cl.⁴ .......................................... A47J 37/04
[52] U.S. Cl. ...................................... 99/419; 99/446; D7/331
[58] Field of Search ................. 99/446, 347, 421 V, 99/419, 421 H; 126/41 A; D7/106, 331

[56]  References Cited
U.S. PATENT DOCUMENTS

| D. 202,157 | 8/1965 | Headberg | 99/419 X |
|---|---|---|---|
| 3,009,410 | 11/1961 | Murphy | 99/421 V |
| 3,211,081 | 10/1965 | Miceli | 99/421 V |
| 4,372,199 | 2/1983 | Brown | 99/421 V |
| 4,380,190 | 4/1983 | Adamis | 99/419 |

FOREIGN PATENT DOCUMENTS 0069187  1/1983  European Pat. Off. ............. 99/419

Primary Examiner—Billy J. Wilhite
Attorney, Agent, or Firm—Andrus, Sceales, Starke & Sawall

[57] ABSTRACT

A compact, knock-down barbeque grill. The grill includes a base or drip pan and a heating basket is mounted on the drip pan. The heating basket includes a bottom having a central cup to collect charcoal starting fluid, a top, and a plurality of sheet metal legs which are located at the corners of the basket and connect the bottom and top. The sides of the basket are enclosed by flat panels of perforated metal. Charcoal, or an electric heating element, is located within the basket as the heat source. Food to be grilled is held on skewers that can be positioned either vertically on the outside of the basket between the drip plate and the overhanging top, or can be positioned horizontally between outwardly projecting extensions on adjacent legs.

14 Claims, 8 Drawing Figures

BARBEQUE GRILL

BACKGROUND OF THE INVENTION

The conventional barbeque grill cooks the food products on a horizontal grill that is positioned above the heat source, which can either be a charcoal bed, or an electric heating element. With grills of this type, grease from the food product will drip downwardly onto the heating source, causing occasional flare-ups which tend to char and overcook the food.

To eliminate this problem, grills have been designed in which the heat source and the food product are positioned in a side-by-side relation. With grills of this type, the grease will drip down into a drip pan, rather than dripping onto the heat source.

U.S. Pat. No. 3,009,410 discloses a barbeque grill in which the charcoal bed is located in an expanded metal basket, and the food product to be cooked is held by skewers that are mounted vertically around the basket. With the grill as disclosed in the aforementioned patent, the skewers are rotated about their axes to obtain more uniform cooking of the food. However, a grill of this type requires an electric power source to rotate the skewers and is not intended to be a portable knock-down unit, adapted for camping, picnics, and the like.

SUMMARY OF THE INVENTION

The invention is directed to a compact, knock-down barbeque grill, in which the food to be cooked is held on skewers that can be mounted either in a horizontal or vertical relation to the heat source. More particularly, the grill includes a base or drip pan and a heating basket which is mounted centrally on the upper surface of the drip pan. The heating basket includes a bottom having a central sump or cup to collect charcoal starting fluid, a top and a plurality of sheet metal legs that are located at the corners of the basket and serve to interconnect the bottom and top.

The sides of the basket are enclosed by flat spanels of welded wire rods and either charcoal or an electric heating element is located within the basket as the heat source.

The food to be grilled is held on skewers that can be positioned on the outside of the basket either vertically, between the drip pan and the overhanging top, or can be positioned horizontally between outwardly projecting extensions on adjacent legs.

When positioned vertically, the skewers are adapted to cook morsel-sized food products such as shish kebab. When positioned horizontally, full portion foods such as chops, steaks, fish and the like can be grilled.

To facilitate basting of the food, when the skewers are mounted vertically, the heating basket can be rotated slightly with respect to the drip pan which will move the skewers to an inclined positioned, rather than a true vertical position.

The heating or charcoal basket can be readily removed from the drip pan to facilitate cleaning. As the food does not contact the charcoal basket, the basket does not require cleaning, and cleaning is limited to the drip pan and skewers.

As the food to be grilled is located in a side-by-side relation to the heating source, grease cannot drip onto the heat source, thereby eliminating flare ups and consequent charring of the food.

The grill can be readily assembled and disassembled and assembly does not require the use of any auxiliary fasteners, such as screws, clips, bolts and the like, for the parts merely snap together. The legs are designed to snap into locking relation with the top and bottom of the basket and the wire form panels exert outward pressure to maintain the legs in position.

The grill facilitates easier ignition of the charcoal through incorporation of the starter cup in the bottom surface of the charcoal basket. Excessive starter fluid will drain into the cup and combustion of the fluid in the cup will act as a vertical torch to aid in igniting the charcoal.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
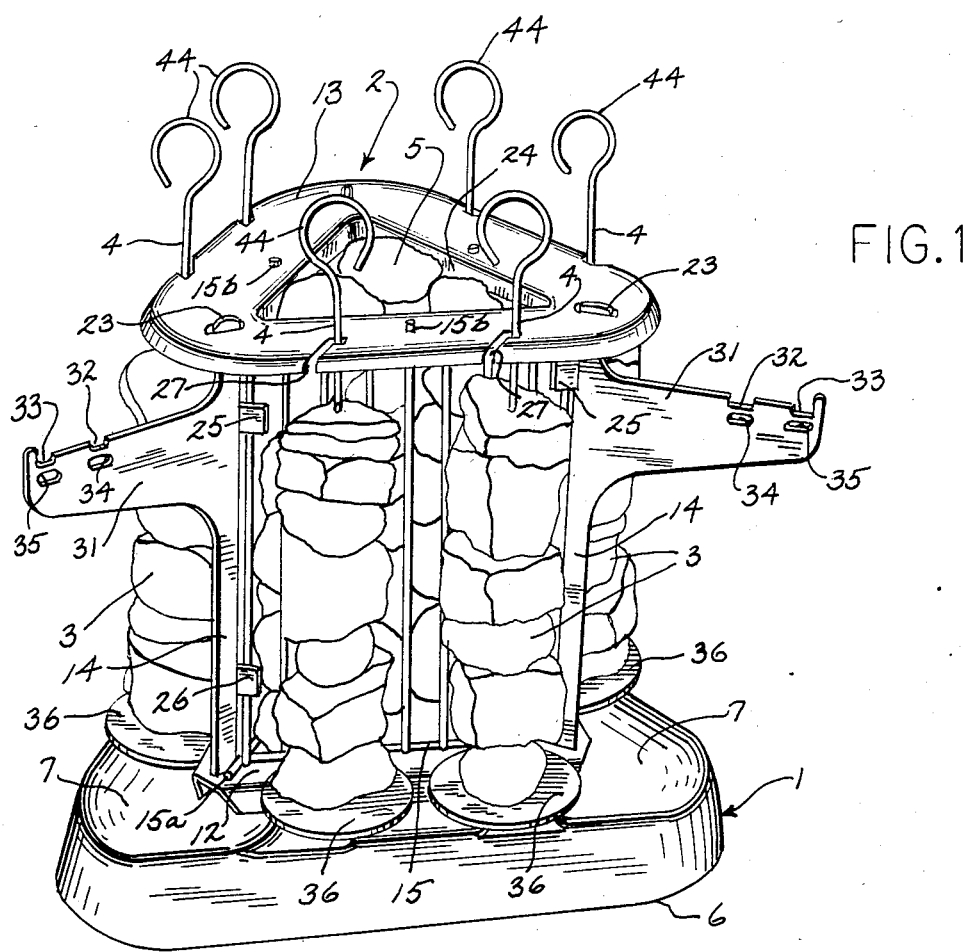
FIG. 1 is a perspective view of the assembled grill of the invention in which the skewers are positioned in a vertical relation.
Figure 2:
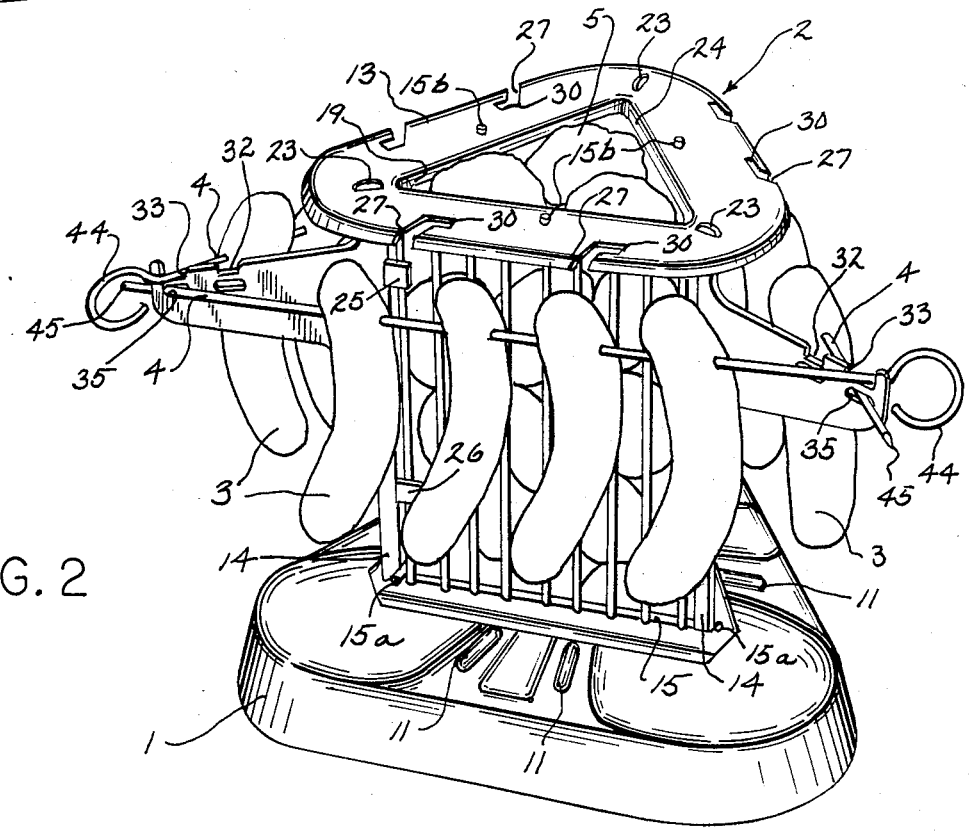
FIG. 2 is a perspective view showing the grill in which the skewers are positioned horizontally.

FIG. 1 illustrates the barbeque grill of the invention which includes a base or drip pan 1 that supports a heating basket 2. A food 3 to be cooked is held on skewers 4 which can be mounted vertically on the outside of basket 2, as shown in FIG. 1, or alternately can be positioned horizontally on the outside of the basket, as shown in FIG. 2. As illustrated in FIGS. 1 and 2, the heat source employed to grill the food product is a bed of charcoal 5.

Figure 3:
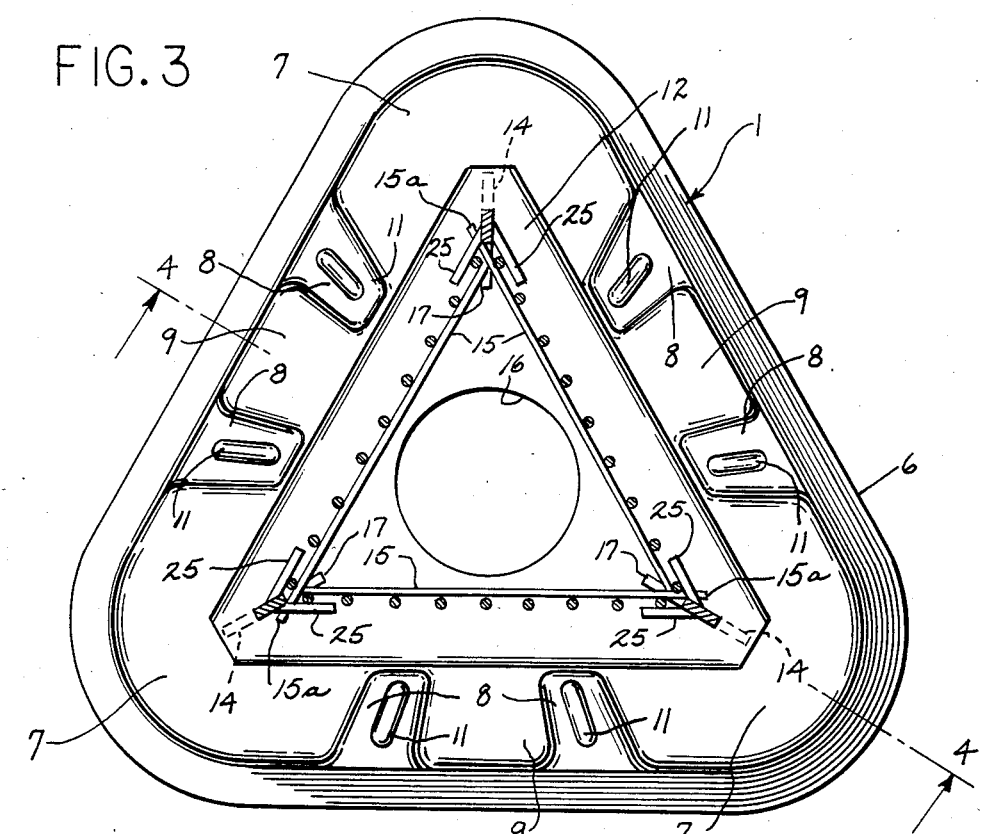
FIG. 3 is a horizontal section of the grill.

As best shown in FIG. 3, the drip pan 1 is generally triangular in shape and includes an outer downwardly extending rim 6. Wells 7 or depressions, which act to receive grease drippings, are located in each corner of the drip pan 1 and a series of ridges 8 extend inwardly from rim 6 adjacent the wells 7. Downwardly and inwardly sloping surfaces 9 are located between each pair of ridges 8 and the surfaces 9 will drain grease downwardly into the wells 7.

Drip pan 1 is formed with a central recess 10 which is spaced inwardly from the inner extremities of ridges 8.

Each of the ridges 8 is provided with a pair of elongated recesses or depressions 11 which receive the lower tips of skewers 4 when the skewers are mounted in a vertical position.

Heating basket 2 includes a triangular bottom 12, a triangular top 13, and a plurality of legs 14 which are located at the corners of the basket and connect the bottom 12 with the top 13. In addition, basket 2 includes a plurality of welded wire rod panels 15 which enclose the sides of the basket and extend between adjacent legs 14.

Bottom 12 is generally triangular in shape and is provided with a central cup or well 16, which is positioned within the central recess 10 of drip pan 1. Bottom 12 slopes toward the cup 6, so that any starter fluid not absorbed in the charcoal 5 contained within basket 2 will flow inwardly along the bottom into the cup 16.

The corners of bottom 12 are provided with slots 17 which receive the feet 18 on the bottom of the respective legs 14. Feet 18 are inserted through the slots 17 and then moved outwardly to lock the leg 14 in position with respect to the bottom 12.

Top plate 13 is also generally triangular in configuration and contains a central triangular shaped opening 19. To connect legs 14 to top plate 13, top plate 13 is provided with a series of holes 20 and depressions 21 are formed in the upper surface of top plate 13 and communicate with the respective holes 20.

Figure 4:
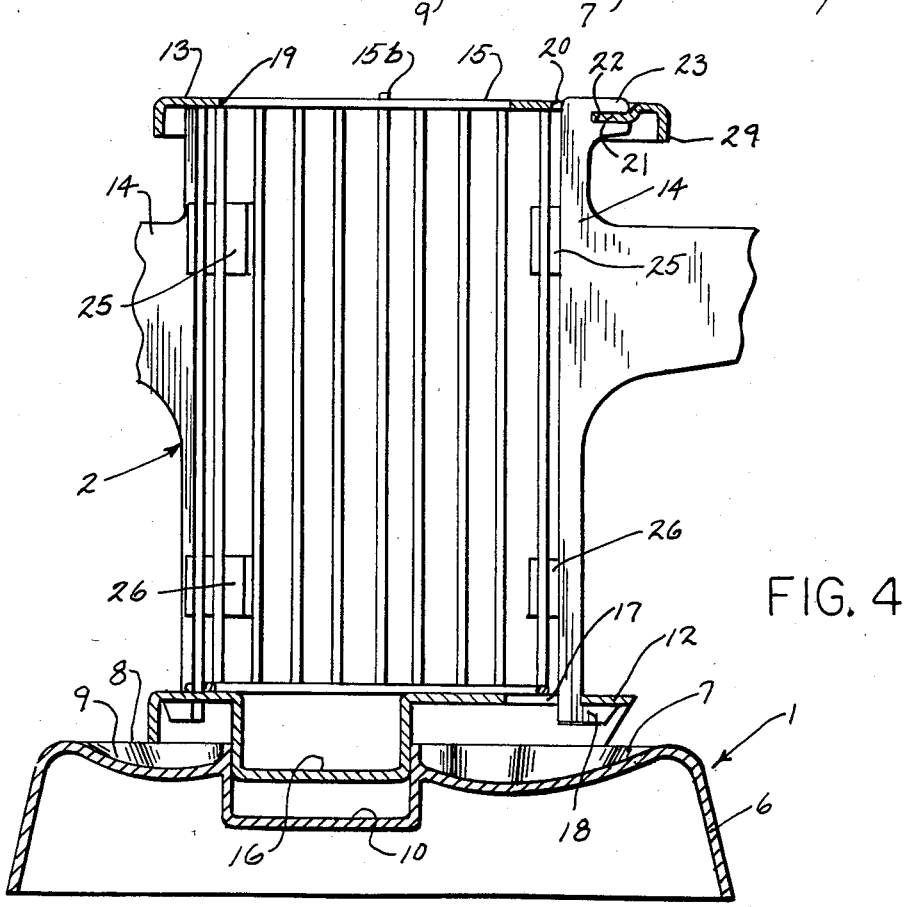
FIG. 4 is a vertical section taken along line 4—4 of FIG. 3.
Figure 5:
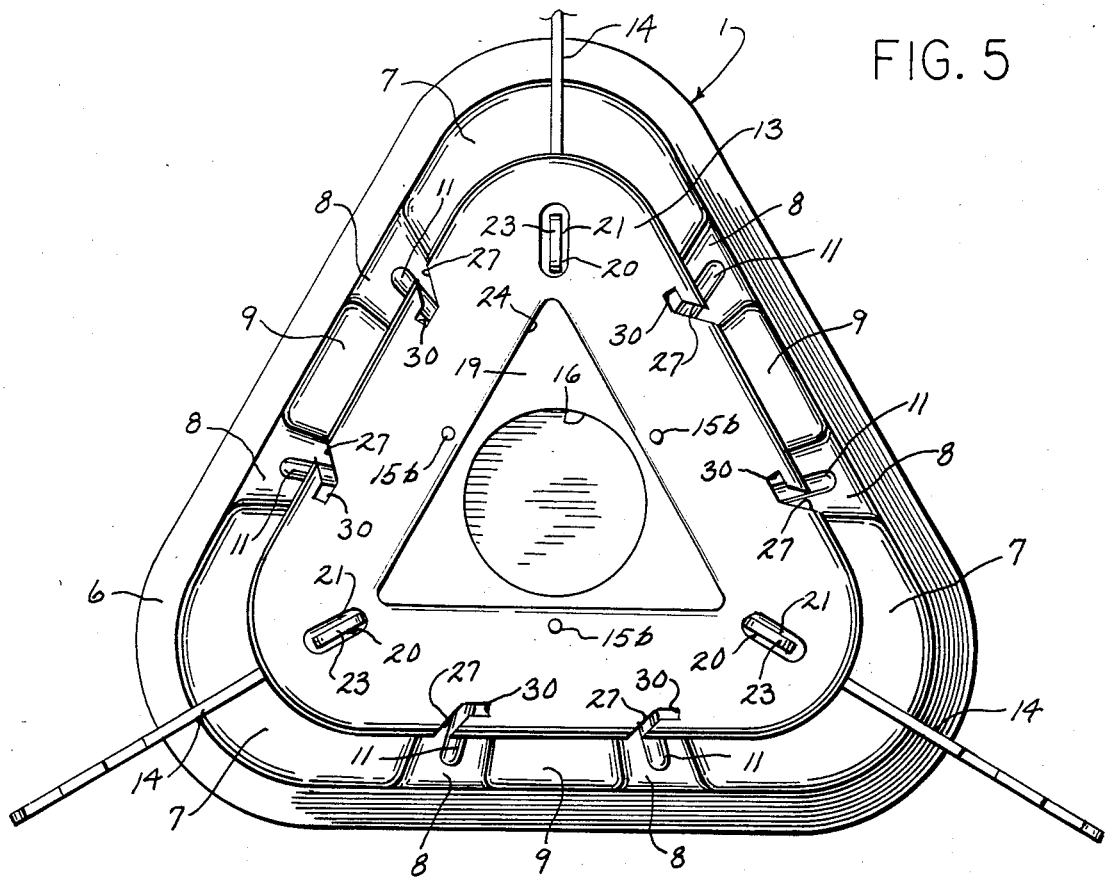
FIG. 5 is a top plan view of the grill.

As best shown in FIG. 4, the upper end of each leg is provided with a groove 22 and an upper flange 23. To connect the leg to the top plate, the flange 23 is inserted through hole 20 and the leg is then pivoted causing flange 23 to move into the depression 21, as shown in FIG. 4, to lock the leg to the top plate.

Top plate 13 is also formed with a downwardly extending flange 24 which borders the central triangular opening 19.

The panels 15 are generally rectangular in shape and the side edges of adjacent panels are retained within a pair of upper tabs 25 associated with each leg 14. As shown in FIG. 3, tabs 25 extend outwardly from the leg 14 and inscribe angle of about 60°. Similarly, the lower ends of adjacent panels are held in position by a pair of lower tabs 26 which are similar in construction to tabs 25. In addition, the upper edge of each expanded metal panel 15 is held against the outer surface of the downwardly extending flange 24 on top plate 13. In addition, one end 15a of the lower horizontal rod of panel 15 projects outwardly beyond the side of the panel and engages the lower end of the corresponding leg 14. With this construction, the welded wire rod 15 will urge the lower ends of legs 14 outwardly to firmly retain the feet 18 in locking relation with the bottom plate 12. The upper end 15b of the central vertical rod of each panel extends upwardly beyond the panel and is received in a hole in top plate 13.

To assemble the basket 2, the flanges 23 on legs 14 are inserted in holes 20 and the legs are then pivoted to bring the flanges into engagement with depressions 21. The feet 18 on the lower ends of the legs are inserted in the respective slots 17 in bottom plate 12 and the three panels 15 are then positioned in the tabs 25 and 26 to complete the assembly. The basket 2 is an integral structure which can be assembled without the use of any auxiliary fasteners or connectors.

Figure 6:
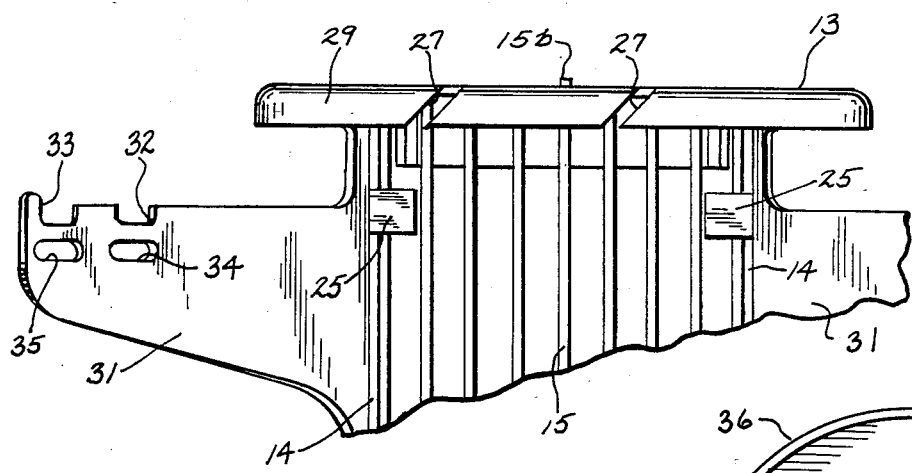
FIG. 6 is an enlarged fragmentary side elevation with parts broken away showing the top member of the basket.

To retain the upper ends of skewers 4, when the skewers are in a vertical position, diagonal slots 27, as illustrated in FIG. 6, are formed in the downwardly extending rim 29 of top plate 13. As shown in FIG. 1, the outer periphery of top plate 13 extends outwardly beyond the expanded metal panels 15 of basket 2. Slots 27 communicate with rectangular recesses 30. Each skewer 4 which is generally square in cross section, is inserted through the diagonal slot 27 is then pivoted vertically in the recess 30 to retain the upper end of the skewer in position. The lower tip of the skewer is then dropped into the recess 11. To aid in basting the food on the vertical skewers 4, the basket can be rotated slightly about its axis so that slots 27 are not in vertical alignment with recesses 11. The skewers 4 will then be at a slight angle to the vertical and the basting liquid will flow down along the food.

Each leg 14 is formed with an outwardly projecting extension 31 and the upper edge of each extension 31 is formed with a pair of notches 32 and 33. In addition, each extension has a pair of holes 34 and 35 which are located directly beneath the respective notches 32 and 33. Skewers 4 are held in the horizontal position by inserting the tip of the skewer through hole 34 in one extension 31 and resting the opposite end of the skewer in the notch 32 on an adjacent extension, as shown in FIG. 3. By supporting the skewers within a notch and an opening, the individual skewers can be removed from the grill without interfering with other skewers. When the skewers are engaged between the notches 32 and holes 34, the food product is in a cooking position, while if the skewers are engaged within the notches 33 and holes 35, the food product would be further away from the heat source and be in a warming position.

With the grill of the invention, the food can be cooked with the skewers 4 vertical and locked between the drip pan 1 and the top plate 13, as shown in FIG. 1, or the food can be cooked with the skewers horizontal and retained between adjacent extensions 31, as shown in FIG. 2. In addition, the grill includes both a cooking position and a warming position on the extensions 31 of legs 14.

Figure 7:
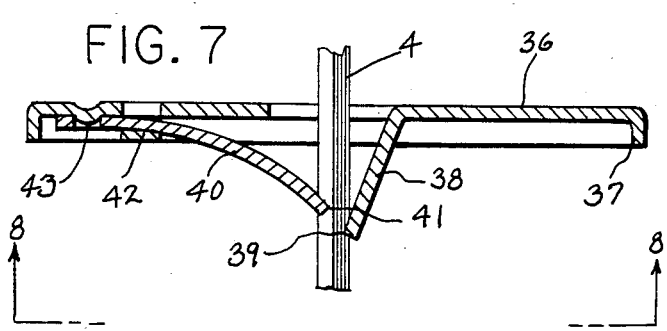
FIG. 7 is a transverse section showing a retaining disc attached to a skewer.
Figure 8:
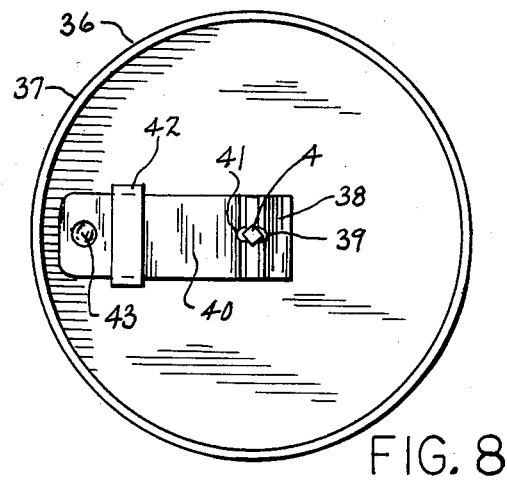
FIG. 8 is a bottom view of the retaining disc.

The invention also includes a novel retainer 36, which is associated with the lower ends of the skewers 4, when the skewers are in a vertical position to prevent the food from slipping off the lower end of the skewer. The retainer 36 is generally disc-shaped and is provided with a downwardly turned peripheral flange 37. The central portion of the retainer has a punched out tab 38 having a central notch 39. Positioned on the lower surface of retainer 36 is a spring steel tongue 40 having a notch 41 in its outer end. As shown in FIG. 7, the skewer 4, having a square cross section, is retained between the mating notches 39 and 41. Tongue 40 extends through a punched out bridge 42 in retainer 36 and the opposite end of the tongue is formed with an opening which engages a projection 43 on the undersurface of the retainer.

As illustrated in FIGS. 1 and 2, the skewers 4 have a handle 44 at one end and a pointed tip 45 on the opposite end. After the food product is inserted on the skewer, the tip 45 is inserted through the opening in the retainer 36 and the tongue 40 serves to lock the skewer against the tab 38. Tongue 40 provides a one-way locking mechanism which permits the skewer 4 to be freely inserted through the retainer 36, but prevents the skewer from being removed unless the tongue 40 is manually released. The retainers 36, when applied to the skewers, prevent the food product from slipping downwardly, or falling from the skewers 4 during or following cooking.

While the drawings illustrate the grill utilizing charcoal 5 as the heat source, it is contemplated that an electric heating element can be mounted in basket 2 and serve as the heat source.

The grill of the invention can be readily assembled and disassembled without the use of any auxiliary fasteners, connectors, or clips. In its disassembled condition, the grill is extremely compact and can be retained in a package having a size of approximately $12'' \times 12'' \times 2\frac{1}{2}''$. The compactness of the grill makes it particularly adaptable for use by campers, boaters, picnicers, and the like.

The charcoal basket 2 is designed to be smaller at the top than at the bottom to minimize shearing action on the charcoal, as the charcoal shifts downwardly and thereby reduce ash blown onto the food.

The food can be cooked either in a vertical or horizontal position and the grill also includes a warming position to maintain the cooked food in a warm condition.

As the heating source is located in a side-by-side relation to the food being cooked, any grease dripping from the food will not contact the heat source and this eliminates flair-up and possible charring of the food. When using the skewers in a vertical position, the flavoring from seasoning foods, such as cheese, onions, peppers, and the like, will drip downwardly over the meat on the skewers rather than dripping into the heat source.

The charcoal basket can be readily removed from the drip pan, so that the drip pan can be cleaned after use. As the food does not contact the charcoal basket, the basket normally will not require cleaning.

While the drawings illustrate panels 15 as being formed of spaced vertical rods, it is contemplated that other forms of perforated metal could be used, such as expanded metal grating. However, the vertical rods have the advantage that they will not shear off the charcoal to produce ash as the charcoal drops within the basket.

Various modes of carrying out the invention are contemplated as being within the scope of the following claims particularly pointing out and distinctly claiming the subject matter which is regarded as the invention.

I claim:

1. A barbeque grill comprising a base, a polygonal-shaped basket mounted on the base and having a plurality of corners, said basket including a bottom member, a top member, and a plurality of legs interconnecting the bottom member and the top member, said basket also including a plurality of perforated metal sides, a heat source disposed within the basket to cook a food product, a skewer to hold the food product, first mounting means for mounting the skewer in a generally vertical relation on the outside of the basket and second mounting means for mounting the skewer in a generally horizontal relation on the outside of said basket.

2. The grill of claim 1, wherein said first mounting means comprises a depression in said base to receive one end of said skewer, said top member having a portion overhanging the corresponding side, said first mounting means also including a recess in said overhanging portion to receive the opposite end of said skewer.

3. The grill of claim 1, wherein said second mounting means comprises an outwardly extending extension disposed on two adjacent legs, said extensions having notches to receive the respective ends of said skewer.

4. The grill of claim 1, wherein said bottom member is provided with a downwardly extending cup and said base has a recess to receive said cup, said heat source being a bed of charcoal contained within the basket and disposed above said cup.

5. The grill of claim 1, wherein said top member has a central opening communicating with the interior of said basket.

6. The grill of claim 1, wherein said basket is generally triangular in shape and said basket includes three legs and three side members.

7. The grill of claim 1, wherein said base has a peripheral portion extending radially outward beyond said bottom member, said peripheral portion having at least one downwardly extending well to receive grease drippings from the food being cooked.

8. The grill of claim 1, and including means for mounting said basket for rotation relative to said base.

9. The grill of claim 1, wherein one end of said skewer is provided with a handle and the opposite end of said skewer has a sharpened tip, and a food retainer having an opening to receive said opposite end of said skewer and hold the food product on the skewer when the skewer is in a vertical position, said retainer including a one-way locking mechanism which permits the skewer to be freely inserted in said opening but prevents the skewer from being moved in the opposite direction, said one-way locking mechanism being manually releasable to enable the skewer to be removed from said opening.

10. A barbeque grill, comprising a base, a polygonal-shaped basket mounted on the base and having a plurality of corners, said base including a bottom member and a top member and having a plurality of legs disposed at said corners and connecting said bottom member and said top member, said basket also including a plurality of generally flat expanded metal panels extending vertically between said top member and said bottom member and extending horizontally between adjacent legs, said basket adapted to receive a bed of charcoal as a heat source to cook a food product, a skewer to hold the food product during cooking, first mounting means including cooperating elements on said top member and said base for mounting the skewer in a generally vertical relation on the outside of said basket, each leg having an outwardly projecting extension, and second mounting means associated with adjacent extensions for mounting said skewer in a generally horizontal position on the outside of said basket.

11. The grill of claim 10, wherein said legs are removably connected to said top and bottom members whereby removal of said legs enables said basket to be disassembled.

12. The grill of claim 10, wherein a lower end of each leg is provided with an outwardly extending foot and said bottom member is provided with an elongated slot to receive the respective foot and lock the lower end of the leg to said bottom member, the upper end of each leg having an outwardly extending flange and said upper member having a hole and a depression formed in the upper surface of said top member and communicating with said hole, said flange extending through said hole and being received in said depression to lock the upper end of the leg to said top member.

13. The grill of claim 12, wherein each leg has a pair of inwardly extending angularly disposed tabs, adjacent edges of said panels being received within said tabs, engagement of the side edge of one panel with the adjacent side edge of an adjacent panel urging the foot on the corresponding leg into engagement with the respective slot to maintain the lower end of said leg in locking engagement with said bottom member.

14. The grill of claim 10, wherein said bottom member is provided with a central downwardly extending recess.

* * * * *